2,770,609

POLYETHYLENE-OLEAMIDE COMPOSITION

Albert Edward Symonds, Jr., Wilmington, Del., assignor to E. I. du Pont de Nemours and Company, Wilmington, Del., a corporation of Delaware No Drawing. Application August 26, 1953, Serial No. 376,745

5 Claims. (Cl. 260—32.6)

This invention relates to a plastic composition of matter, and more particularly to a polyethylene composition and articles made therefrom having improved properties with respect to blocking and coefficient of friction.

It has been known for some time that one of the major drawbacks of thin films of polyethylene is a high film-to-film coefficient of friction, which often prevents the feeding of single sheets to automatic packaging equipment. Another disadvantage of thin polyethylene films is the tendency for these films to block. Blocking is the adherence of two or more film surfaces to each other while standing under pressure. In the manufacture of blown polyethylene film, for example, this blocking phenomenon manifests itself in the adherence of the inner surfaces of the polyethylene tube to each other, making it difficult if not impossible to open the tube.

An object of this invention is to provide a plastic composition based on polyethylene which possesses markedly reduced film-to-film coefficient of friction. Another object is to provide a polyethylene composition which upon conversion into sheets and films possesses greatly improved resistance to blocking. A further object is to provide an improved polyethylene composition with respect to blocking and coefficient of friction without significantly affecting other properties of films made therefrom, such as transparency, haze, vapor permeability, and the like. Other objects will be apparent from the description of the invention given below.

This invention provides a plastic composition comprising polyethylene and a small amount of oleamide. The invention also includes a composition comprising polyethylene and small amounts of oleamide together with ethylene distearamide. Another modification of the invention provides articles made from the above polyethylene compositions in the form of films, sheets, tubes, coatings, and other formed structures having lower blocking tendencies and lower coefficients of friction.

The composition may be prepared by any method suitable for insuring a uniform mixture of polyethylene and additives in the final fabricated article. Suitable methods include addition of the amide as a solid, in solution, or in the form of a slurry in water or other non-solvent, to the polyethylene in either the dry fluff or molding powder form followed by drying and tumbling. The amide may also be incorporated in the polyethylene by melt blending the ingredients in conventional apparatus, such as a Banbury mixer, heated rolls, or a plasticator. A concentrate of the amide in polyethylene can be made by one of the aforesaid methods and this in turn can be blended with polyethylene molding powder by tumbling or other suitable means. Finally, various combinations of the above methods can be used.

It has also been discovered in accordance with this invention that a highly useful composition is produced by preparing a polyethylene composition containing a mixture of small amounts of oleamide and ethylene distearamide. The combination of these two particular amides in polyethylene produces a composition which has properties far superior to polyethylene containing either amide alone. Polyethylene films containing small amounts of both additives possess a combination of properties not heretofore attainable by any known means. These properties include increased resistance to blocking, reduced film-to-film coefficient of friction, and a reduction in static pickup.

In general the proportion of oleamide used in polyethylene to achieve any significant reduction in the coefficient of friction must be at least 0.01% by weight of the polyethylene. Increasing amounts of oleamide will of course further reduce the film-to-film coefficient of friction. Usually there will be no particular advantage of employing amounts greater than 0.5% of oleamide by weight of the polyethylene. It is preferred to use between 0.025% and 0.075%.

When ethylene distearamide is employed together with oleamide in polyethylene it will usually be desirable to add from 0.025% to 0.5% of the distearamide by weight of the polyethylene to achieve improved resistance to blocking in films made from the compounded ingredients.

It was surprising to discover that oleamide is quite specific in its ability to reduce the film-to-film coefficient of friction of polyethylene. None of the high melting waxes of different chemical compositions which reduce blocking of polyethylene films had any large effect on the coefficient of friction of said films. Furthermore, no other amides tested, such as stearamide, hydroxystearamide, and distearamides, had any appreciable effect on reducing the coefficient of friction. In other words, the only satisfactory compound known for this purpose is oleamide.

The chief advantage of the polyethylene compositions containing oleamide is the fact hat these compositions allow the production of transparent polyethylene films, tubes, and other shaped articles having greatly reduced film-to-film coefficient of friction. Another advantage is achieved in employing a combination of oleamide and ethylene distearamide in polyethylene to produce a composition which exhibits not only reduced film-to-film coefficient of friction and reduced tendency toward blocking, but also exhibits improved antistatic qualities without significantly altering the film draw rate, transparency, haze, vapor permeability, and heat sealability of polyethylene.

Although the compositions of this invention are composed essentially of polyethylene containing small amounts of specific amides, the compositions may also contain small amounts of other desirable additives, such as high melting waxes, antioxidants for the polyethylene, dyes and pigments for coloring the polyethylene, lubricants, antistatic agents, and the like, provided the additional ingredients are not present in amounts sufficient to alter the efficacy of the oleamide or its mixture with the distearamide.

Examples of high melting waxes having a melting point of at least 80° C. which may be employed in amounts less than 0.5% of the polyethylene in place of or in addition to the ethylene distearamide in polyethylene containing oleamide include any of the following: hydrogenated castor oil ("Opalwax") (M. P. 86–88° C.), stearamide (M. P. 108–109° C.), and hydroxystearamide (M. P. 101–102° C.). These high melting waxes offer some additional resistance to blocking in polyethylene films.

It has been found that the addition of oleamide to polyethylene is effective in markedly reducing the film-to-film coefficient of friction of all of several different solid polyethylenes tested, regardless of the molecular weight or crystallinity of the particular polyethylene.

The polyethylene compositions of this invention are particularly useful for fabrication by extrusion into thin films, sheets, blown tubing, and the like. The compositions may also be cast, extruded, or molded into films, sheets, rods, tubes and piping, filaments and other shaped articles. The compositions may also be used for coating paper, cloth, wire, metal foil, glass fiber mats, synthetic and natural textiles and other substrates.

The following example illustrates specific embodiments of this invention. All parts are given by weight unless otherwise specified.

This example illustrates the effect of oleamide in reducing the film-to-film coefficient of friction of polyethylene as well as other advantages when mixed with ethylene distearamide. The indicated amounts of oleamide and other modifiers given in Table I were incorporated in commercially-available samples of polyethylene having a number average molecular weight of 26,000–30,000 (determined by measuring the viscosity of dilute solutions in xylene according to Harris J. of Polymer Science, 8, 353 (1952)) by dissolving them in enough methylene chloride to give approximately a 10% solution, and adding this solution as a fine stream to polyethylene molding powder in a double ribbon horizontal blender with constant blending. Blending was continued for about 15 minutes, after which no odor of methylene chloride remained due to evaporation, and the samples appeared to be homogeneous. The blended compositions were then extruded into flat film by forcing them through a standard plastics extrusion machine having a die temperature of 280° C., or by extruding the compositions into blown tubing at a temperature of 170° C., which was then slit to flat film. The extruded film was then tested for its tendency to block by measuring the adherence of two film surfaces to each other after standing under pressure. The test used to measure this blocking property was ASTM D-884 modified by using 3" x 5" film samples, pressing together at a temperature of 60° C. for twenty-four hours under a load of 1 lb./sq. inch. The films were allowed to cool to room temperature and then peeled apart while measuring the applied force. The force required to pull the films apart was then reported in millipounds/inch. The coefficient of friction or slip was then measured between two pieces of the same film by moving one film over another at a constant rate under specified loadings. The resistance to sliding was measured on a spring balance. The coefficient of friction was then obtained by dividing the force required to move the film by the load on the film.

TABLE I

*Effect of various compounds on polyethylene film properties*

| Compound | Conc. (percent by wt.) | Type of Extrusion | Blocking (millipds./in.) | Coef. of Friction |
|---|---|---|---|---|
| Control | | Flat | 16.1 | >2.3 |
| Ethylene distearamide | 0.2 | do | 0.7 | >2.3 |
| Stearamide | 0.1 | do | 1.5 | >2.3 |
| Hydroxystearamide | 0.2 | do | 1.6 | >2.3 |
| Ethylene distearamide | 0.2 | do | 1.2 | >2.3 |
| Oleamide | 0.20 | do | | 0.18 |
| Do | 0.15 | do | | 0.13 |
| Do | 0.10 | do | 126 | 0.26 |
| Do | 0.075 | do | | |
| Ethylene distearamide | 0.05 | do | 1.8 | 0.2 |
| Oleamide | 0.03 | do | | 0.4 |
| Ethylene distearamide | 0.05 | | | |
| Oleamide | 0.01 | do | | 1.3–2.0 |
| Ethylene distearamide | 0.05 | | | |
| Oleamide | 0.05 | do | | 0.1 |
| Ethylene distearamide | 0.05 | | | |
| Oleamide | 0.05 | Blown | 0.6 | 0.2 |
| Ethylene distearamide | 0.05 | | | |
| Oleamide | 0.1 | do | 0.37 | 0.11 |
| Ethylene distearamide | 0.1 | | | |

I claim:

1. A plastic composition comprising polyethylene and 0.01% to 0.5% by weight of oleamide, based on the weight of polyethylene.

2. A plastic composition comprising polyethylene and 0.025% to 0.075% by weight of oleamide, based on the weight of polyethylene.

3. A plastic composition comprising polyethylene, 0.01% to 0.5% by weight of oleamide, and 0.025% to 0.5% by weight of ethylene distearamide, based on the weight of polyethylene.

4. A plastic composition comprising polyethylene, 0.025% to 0.075% by weight of oleamide and 0.025% to 0.5% by weight of ethylene distearamide, based on the weight of polyethylene.

5. A plastic composition comprising solid polyethylene and 0.1% to 0.5% by weight of oleamide, based on the weight of polyethylene.

References Cited in the file of this patent

UNITED STATES PATENTS 2,516,591    Remington    July 25, 1950